Oct. 9, 1923.
M. JAGIELSKI
1,469,791
ANIMAL RELEASING DEVICE
Filed March 9, 1922
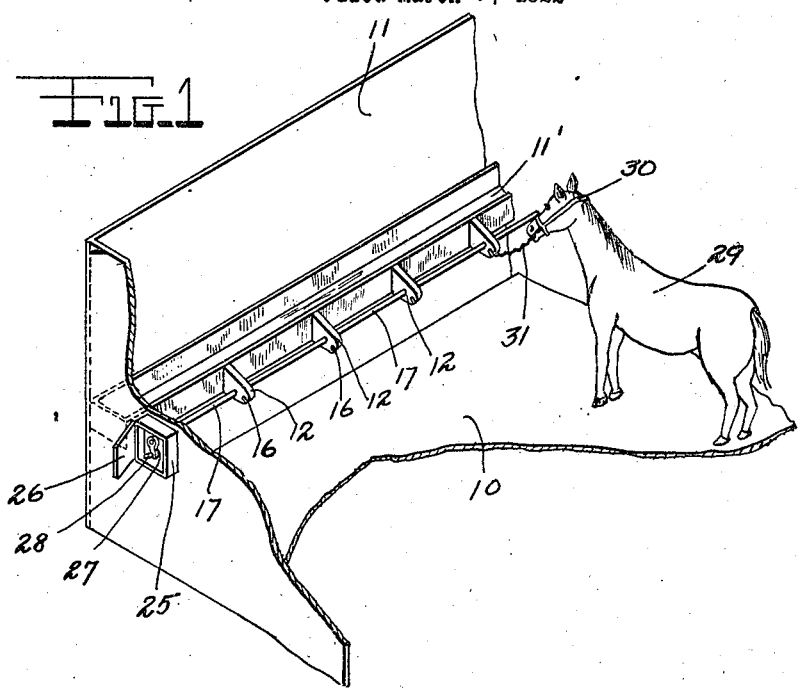
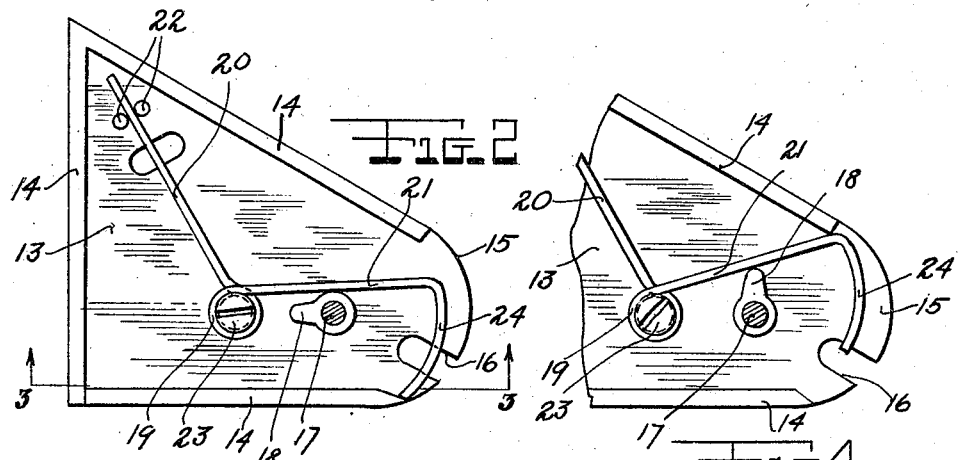
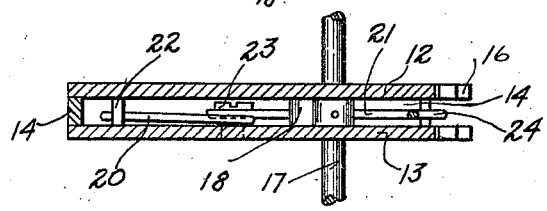
INVENTOR
M. Jagielski
BY
ATTORNEY Patented Oct. 9, 1923.

1,469,791

UNITED STATES PATENT OFFICE.

MICHAEL JAGIELSKI, OF GRAND RAPIDS, MICHIGAN.

ANIMAL-RELEASING DEVICE.

Application filed March 9, 1922. Serial No. 542,249.

*To all whom it may concern:*

Be it known that I, MICHAEL JAGIELSKI, a citizen of the United States, residing at Grand Rapids, in the county of Kent and State of Michigan, have invented certain new and useful Improvements in Animal-Releasing Devices, of which the following is a specification.

One of the principal objects of this invention is to provide means by which horses, cattle or other animals, secured in stalls or in stanchions may be safely and expeditiously released from their fastenings in case of fire.

Another object is the means provided by which a plurality of locking arms, engaging halter rings may be simultaneously released from a point distant from a stable, thus freeing the animals and allowing them to escape from a burning stable.

These and other objects are attained by the novel combination and arrangement of parts hereinafter described and shown in the accompanying drawing, forming a material part of this disclosure, and in which:—

Figure 1 is a fragmental perspective view of a stable having stalls arranged in accordance with the invention.

Figure 2 is a side elevational view of a stanchion side showing the locking mechanism in locked position.

Figure 3 is a sectional view taken on line 3—3 of Figure 2.

Figure 4 is a partial side elevational view of a stall showing the securing mechanism in unlocked or open position.

Referring to the drawing in detail, the numeral 10 designates the floor of a stable, and 11 the adjacent front wall to which is fixed a feed trough 11 having on its front a plurality of outstanding elements 12, one for each of the animals.

These stall members comprise a pair of side plates 12 and 13, separated one from the other by ribs 14 fixed between the plates at their edges, except at their rounded front ends 15 the slots 16 are formed thru the plates 12 and 13.

A horizontal rod 17 passes transversely thru the stall division and cams 18 are secured to the rod 17 between the side plates 12 and 13.

The spring locking means for restraining the animals comprises a single coiled spring element 19 having extending ends 20 and 21, the former being secured near the upper rear corner between the plates 12 and 13, by a pair of pins 22 fixed in the plates.

A shouldered screw 23 engaged within the coil 19 of the spring, is threaded into the plate 13 back of the rod 17, and the spring end 21 extends forward and terminates as an arcuately curved locking bolt 24, the extreme end abutting the angular outer end of the lower rib 14, when the bolt 24 is in locked or normal position as shown in Figure 2.

A protective casing 25, having a hinged door 26, is preferably arranged outside of the stable, as shown in Figure 1, the rod 17 extends thru the stable wall into the casing and a crank 27 is secured thereon, having a handle 28.

If the crank 27 be partially rotated by a movement of the handle 28, the entire length of the rod 17 will also be partially rotated and the releasing cams 18 will be brought into engagement with the horizontal element 21 of the spring locking bolt 24 and forced backward, thus opening the slot 16, releasing a halter ring and freeing the animal.

Under normal conditions or when but one animal is to be secured or released at a time, the locking bolt 24 may be retracted from the slot 16 by a person's hand entered in the opening between the plates and exerting an upward manual pull on the locking bolt 24.

Figure 1 illustrates in a practical way, the arrangements of a stable equipped with the safety device described, and indicates an animal, as a horse 29, wearing a bridle ring 30 to which is attched a halter 31 having at its free end a loop or ring adapted to engage about the locking bolt 24 and to be secured thereon within the slots 16 of the plates 12 and 13.

It will be readily understood that in case of fire, the release of the tethered animals may be safely and expeditiously accomplished by a person capable of manipulating the release crank.

While certain preferred embodiments of this device have been shown and described, it is apparent that minor changes may be made, not involving the exercise of invention or conflicting with the scope of the invention as defined by the appended claim.

Having thus described my invention, what

I claim as new and desire to secure by Letters Patent, is:—

A device of the class described comprising in combination with a wall, a plurality of forwardly extending chambered elements fixed to said wall, said elements being open at their curved fronts and containing inreaching recesses in their side members, spring locking bolts pivoted between the side members of said elements, their free ends being curved in the manner of a hook to normally extend between the slotted side members to retain a ring entered therein, the hook ends of said bolts being individually manually raised through the open front, a rod passing transversely through all of said chambered elements, and cams fixed on said rod, between the side members of each chambered element for releasing all of said locking bolts simultaneously upon its partial rotation.

In witness whereof I affix my signature.

MICHAEL JAGIELSKI.